United States Patent
Oh et al.

(10) Patent No.: US 8,606,310 B2
(45) Date of Patent: Dec. 10, 2013

(54) METHOD AND APPARATUS FOR CONTROLLING INTERFERENCE BETWEEN BASE STATIONS

(75) Inventors: Sang Chul Oh, Daejeon (KR); Seung-Que Lee, Daejeon (KR); Hyung Deug Bae, Daejeon (KR); Jun Sik Kim, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 215 days.

(21) Appl. No.: 12/860,512

(22) Filed: Aug. 20, 2010

(65) Prior Publication Data

US 2011/0151907 A1    Jun. 23, 2011

(30) Foreign Application Priority Data

Dec. 21, 2009 (KR) ................ 10-2009-0127908

(51) Int. Cl.
*H04B 15/00* (2006.01)

(52) U.S. Cl.
USPC ......... 455/501; 455/418; 455/423; 455/426.1

(58) Field of Classification Search
USPC ....................................... 455/501
See application file for complete search history.

(56) References Cited

U.S. PATENT DOCUMENTS

| | | | | |
|---|---|---|---|---|
| 6,591,099 | B1 * | 7/2003 | Syed et al. | 455/426.1 |
| 8,126,403 | B2 * | 2/2012 | Wang Helmersson et al. | 455/63.1 |
| 2008/0144493 | A1 * | 6/2008 | Yeh | 370/230 |
| 2008/0268833 | A1 * | 10/2008 | Huang et al. | 455/425 |
| 2009/0082026 | A1 | 3/2009 | Yavuz et al. | |
| 2009/0135754 | A1 | 5/2009 | Yavuz et al. | |
| 2009/0253421 | A1 * | 10/2009 | Camp et al. | 455/418 |
| 2009/0274077 | A1 * | 11/2009 | Meylan et al. | 370/280 |
| 2010/0157910 | A1 * | 6/2010 | Nentwig et al. | 370/329 |
| 2010/0189074 | A1 * | 7/2010 | Liao | 370/331 |
| 2013/0012249 | A1 * | 1/2013 | Centonza et al. | 455/501 |

FOREIGN PATENT DOCUMENTS

| | | |
|---|---|---|
| KR | 1020080045096 | 5/2008 |
| KR | 1020090037636 | 4/2009 |

OTHER PUBLICATIONS

ETSI TS 136 300 V9.1.0, "LTE; Evolved Universal Terrestrial Radio Access (E-UTRA) and Evolved Universal Terrestrial Radio Access Network (E-UTRAN); Overall description; Stage 2," ETSI, 169 pages (2009).

* cited by examiner

*Primary Examiner* — Ajibola Akinyemi

(74) *Attorney, Agent, or Firm* — Nelson Mullins Riley & Scarborough LLP; Anthony A. Laurentano, Esq.; Dipti Ramnarain, Esq.

(57) ABSTRACT

A method for controlling interference between base stations in a radio communication system in which an indirect interface for indirectly connecting the base stations exists and an direct interface for directly connecting the base stations does not exist, the method includes: converting a first interference control message used in the direct interface into a format of a protocol of the indirect interface to thereby generate a second interference control message; and transmitting the second interference control message through the indirect interface.

20 Claims, 4 Drawing Sheets

INTERFERENCE CONTROL MESSAGE(200)

| ... | UL INTERFERENCE OVERLOAD INDICATOR (210) | UL HIGH INTERFERENCE INDICATOR (220) | RELATIVE NARROWBAND TX POWER (230) | ... |
|---|---|---|---|---|

METHOD AND APPARATUS FOR CONTROLLING INTERFERENCE BETWEEN BASE STATIONS

CROSS-REFERENCE(S) TO RELATED APPLICATION(S)

The present invention claims priority of Korean Patent Application No. 10-2009-0127908, filed on Dec. 21, 2009, which is incorporated herein by reference.

FIELD OF THE INVENTION

The present invention relates to a method and apparatus for controlling interference between base stations, and, more particularly, to a method and apparatus for controlling interference between femtocell base stations which can control the interference between the femtocell base stations using an existing X2 interference control message, in a femtocell environment where no X2 interface exists.

BACKGROUND OF THE INVENTION

In next generation multimedia radio communication systems which have been actively studied in recent years, It is required that a variety of information (e.g., video and radio data) beyond the early voice-oriented services is processed at a higher data transfer rate.

Accordingly, orthogonal frequency division multiplexing (OFDM) capable of having a high data transfer rate has attracted attention. The OFDM is a multi-carrier modulation scheme in which data transmission is achieved by dividing a frequency band into a plurality of orthogonal subcarriers. Orthogonal frequency division multiple access (OFDMA) provides multi-user multiplexing by combining the OFDM with frequency division multiple access (FDMA), time division multiple access (TDMA) or code division multiple access (CDMA).

A radio communication system includes a base station (BS) and at least one user equipment (UE). The UE may be fixed or mobile and can also be referred to as a mobile station (MS), a user terminal (UT), a subscriber station (SS), a wireless device, and the like.

The base station commonly refers to a fixed station which communicates with the user equipment, and it can also be referred to as a Node-B, a base transceiver system (BTS), an access point (AP), and the like. Hereinafter, an uplink (UL) refers to a transmission from the user equipment to the base station, and a downlink (DL) refers to a transmission from the base station to the user equipment.

Meanwhile, as the use of privately owned base stations or private-purpose base stations increases in addition to the use of existing service provider-owned base stations or public-purpose base stations, femtocell base stations have been used.

A femtocell is a service area of an ultra-small communication base station (a femtocell base station) used indoors, for example, in private homes or offices. The femtocell has advantages in that it can provide a fixed mobile convergence (FMC) service at a low cost by connecting the mobile terminal to the Internet, and can efficiently provide a variety of FMC services by expanding an indoor coverage and improving a call quality.

The demand for femtocell standardization was proposed as a standardization item in the 3rd Generation Partnership Project (3GPP) in the early 2007, and femtocell standardization activities have been carried out as a main issue in the 3GPP2 since June 2007. The femtocell is referred to as a home node B (HNB) in the 3GPP. TSG-RAN WG4 (Technical Specification Group-Radio Access Network Working Group 4) has led the discussion about the standardizations of 3G HNB based on wideband CDMA (WCDMA) and Long Term Evolution (LTE) Home evolved Node B (HeNB) based on LTE.

Also, in the 3GPP2, methods for minimizing the influence of the existing networks and the interfaces between macrocells have become a main issue. While various problems such as a network architecture for circuit switched/packet switched (CS/PS) service, an interface management, a handover scheme, an access system selection, a synchronization, and the like, have been under discussion, the 3GPP2 having first carried out the standardization activities took the leading position in the femtocell standardization over the 3GPP.

The femtocell can provide a high-capacity service, which has been provided in an existing wired broadband service, at a low cost under radio environments by configuring cells in a small size and remarkably increasing a frequency reuse rate, to thereby provide a high-speed data service regardless of places of users. Hence, such a femtocell technology has showed a possibility as the foundation for introduction of new services and expansion of next generation mobile communication markets following 3G.

However, since such femtocell base stations are installed in an uncoordinated, random and dense fashion, interference may occur more than in the existing macrocell base stations.

The interference between the femtocell base stations may degrade the quality of service (QoS) provided to the mobile terminal and also cause a call drop. Therefore, there is a need for technologies which can minimize interference occurring between the femtocell base stations in order for the femtocell base stations to successfully operate.

An Evolved-Universal Terrestrial Radio Access Network (E-UTRAN) architecture in which no femtocell base stations are included will be first described. The base stations (Evolved Node-Bs (eNBs)) are connected through interfaces to Evolved Packet Cores (EPCs) which are upper nodes. The EPCs may include a Mobility Management Entity (MME) and/or a Serving-GateWay (S-GW).

In the E-UTRAN architecture, an interface between the eNBs is referred to as an X2 interface, and an interface between the EPC and the eNB is referred to as an S1 interface. That is, the X2 interface refers to an interface which directly connects the eNBs to each other, and the S1 interface refers to an interface which indirectly connects the eNBs to each other passing through the MME and/or the S-GW.

In general, interference between the macrocell base stations can be reduced by exchanging an interference control message between the macrocell base stations. In this case, the interference control message is exchanged through the X2 interface.

However, the interference control message having been used in the existing X2 interface cannot be exchanged in a femtocell environment where no X2 interface exists, and the interference-related messages associated with the S1 interface have to be newly defined.

SUMMARY OF THE INVENTION

In view of the above, the present invention provides a method and apparatus for controlling interference between femtocell base stations in a femtocell environment where no X2 interface exists by using an existing X2 interference control message, without newly defining an interference control message in an S1 interface.

In accordance with a first aspect of the present invention, there is provided a method for controlling interference between base stations in a radio communication system in which an indirect interface for indirectly connecting the base stations exists and an direct interface for directly connecting the base stations does not exist, the method including:

converting a first interference control message used in the direct interface into a format of a protocol of the indirect interface to thereby generate a second interference control message; and transmitting the second interference control message through the indirect interface.

In accordance with a second aspect of the present invention, there is provided an apparatus for controlling interference between base stations in a radio communication system in which an indirect interface for indirectly connecting the base stations exists and an direct interface for directly connecting the base stations does not exist, the apparatus including:

a generation unit for converting a first interference control message used in the direct interface into a format of a protocol of the indirect interface to thereby generate a second interference control message; and a transmission unit for transmitting the second interference control message through the indirect interface.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
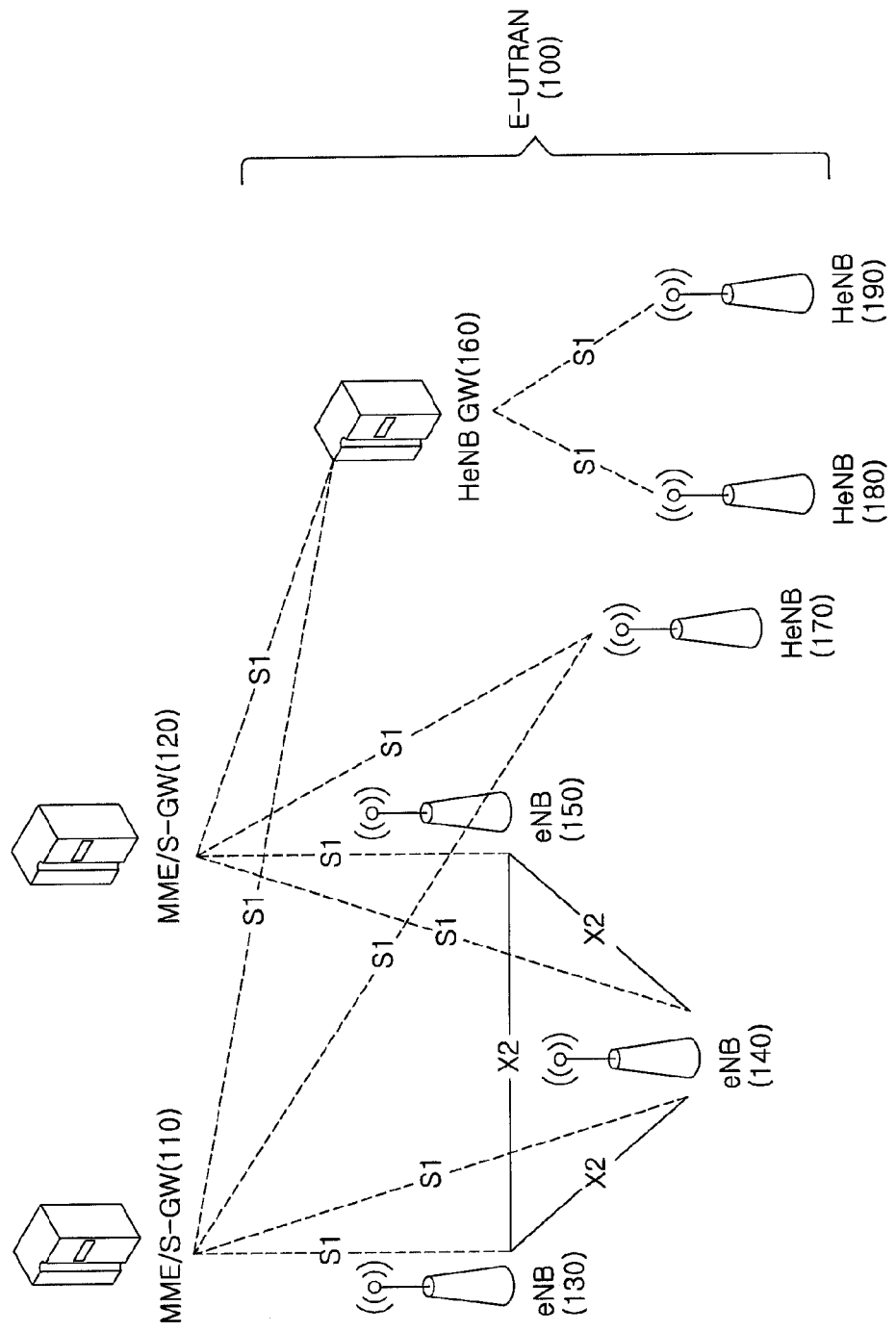
FIG. 1 shows an E-UTRAN architecture including a Home eNB GateWay in accordance with an embodiment of the present invention.

FIG. 1 shows an E-UTRAN architecture including a Home eNB GateWay (HeNB GW) in accordance with an embodiment of the present invention. Evolved Node-Bs (eNBs) 130, 140 and 150 are macrocell base stations which support macrocells. The eNBs 130, 140 and 150 are connected through interfaces to Evolved Packet Cores (EPCs) 110 and 120 which are upper nodes. The EPCs 110 and 120 may include a Mobility Management Entity (MME) and/or a Serving GateWay (S-GW).

An interface which directly connects the eNBs 130, 140 and 150 to one another is referred to as an X2 interface, and an interface which connects the eNBs 130, 140 and 150 to the EPCs 110 and 120 is referred to as an S1 interface.

Meanwhile, Home evolved Node-Bs (HeNBs) 170, 180 and 190 are femtocell base stations which support femtocells. A Home eNB GateWay (HeNB GW) 160 having the S1 interface may be provided between the HeNBs 180 and 190 and the EPC 120 (including the MME and/or the S-GW) in order to support the expansion to a large number of HeNBs. The S1 interface is divided into two traffic planes known as a C-plane (control plane) and a U-plane (user plane). The C-plane carries control (signal) traffic, and the U-plane carries user data.

The HeNB GW 160 simply operates as a concentrator with regard to the C-plane. An interface between the HeNB GW 160 and the HeNBs 180 and 190 with regard to the C-plane is referred to as an S-MME interface, and an interface between the HeNB GW 160 and the HeNBs 180 and 190 with regard to the U-plane may be referred to as an S1-U interface. The S1-U interface may be disconnected in the HeNB GW 160, or may be forwarded by the HeNB GW 160 and disconnected in the EPC 120. The HeNB GW 160 may look like an MME to the HeNBs 180 and 190 and may look like a HeNB to the MME 120.

As mentioned above, regarding the macrocell base stations, the X2 interfaces are defined between the eNBs 130, 140 and 150 and the S1 interfaces are defined between the eNBs 130, 140 and 150 and the EPCs 110 and 120. However, regarding the femtocell base stations, no X2 interfaces may be defined between the HeNBs 170, 180 and 190, and only the S1 interfaces may be defined between the HeNB GW 160 and the HeNBs 180 and 190.

In this case, since the HeNBs 170, 180 and 190 are installed in a highly dense form, interference may occur more than in existing macrocell base stations. Thus, the interference must be controlled by exchanging an interference control message between the HeNBs. However, newly defining the interference control message in the S1 interface under a femtocell environment where no X2 interface exists may cause waste of processing and resources. Therefore, the present invention provides a method which uses an existing X2 interference control message in an S1 interface.

Figures 2, 3:
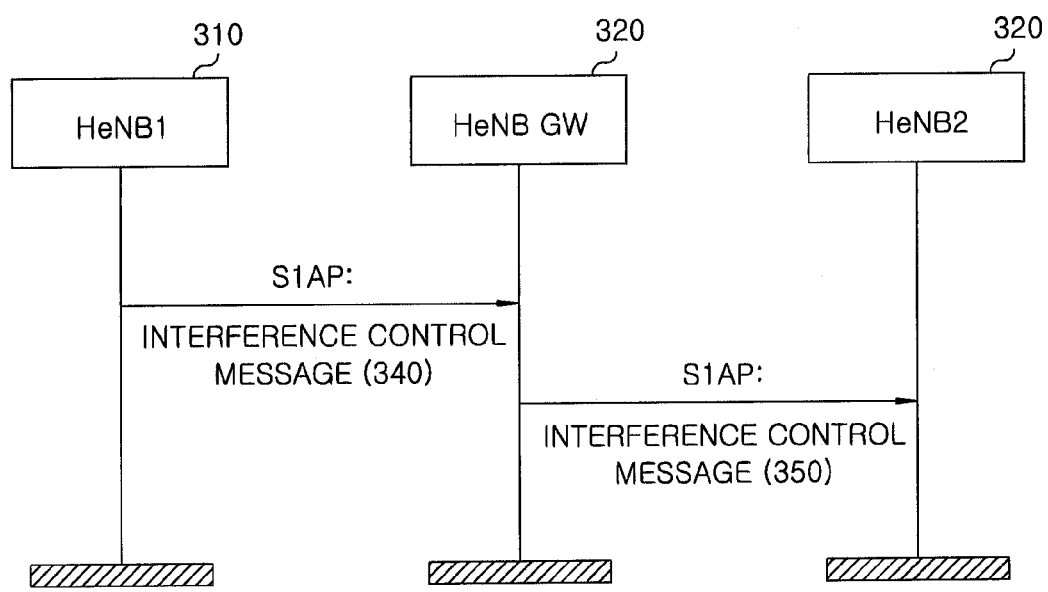
FIG. 2 shows an interference control message in accordance with the embodiment of the present invention.
FIG. 3 shows procedures of transferring an interference control message by using an S1 interface between femtocell base stations in accordance with the embodiment of the present invention.

FIG. 2 shows an interference control message 200 in accordance with the embodiment of the present invention. The interference control message 200 is an interference control message exchanged on an existing X2 interface and may include load information in order to control interference between neighboring base stations. The load information may include an UL interference overload indicator 210, an UL high interference indicator 220, and a relative narrowband Tx power 230.

Also, the interference control message 200 may include a noise and interference level of a corresponding base station, allowing a Tx power to be determined within a range where adjacent base stations are not interfered. In addition, the interference control message 200 may include information about an user equipment located at an edge of a cell, or information about power control of the user equipment.

Furthermore, the interference control message 200 may include a variety of information necessary to control interference between the base stations.

FIG. 3 shows procedures of transferring an interference control message by using an S1 interface between femtocell base stations in accordance with the embodiment of the present invention. The interference between a HeNB1 310 and a HeNB2 330 can be controlled by transferring an interference control message 340 from the HeNB1 310 to a HeNB GW 320 through the S1 interface and transferring an interference control message 350 from the HeNB GW 320 to the HeNB2 330 through the S1 interface.

In this regard, in a case where an interference control message used in an existing X2 interface is converted into a format of an S1 Application Protocol (S1AP) which is a C-plane protocol of an S1 interface, the interference control message can be transferred through the S1 interface. In the embodiment, the interference control message used in the X2 interface is inserted into an X2 message container information element (IE) and transferred in the format of S1AP.

Meanwhile, the X2 message container IE may be transferred through the existing S1 interface by using a piggyback scheme which inserts a plurality of information into a single frame and transmits it.

That is, when the HeNB1 310 intends to perform an interference control with respect to the neighboring HeNB2 330, the X2 interference control message having been used in the X2 interface is encoded and inserted in the X2 message container IE. The X2 message container IE including the X2 interference control message is transferred to the HeNB GW 320, and then to the HeNB2 330 through the S1 interface.

Figure 4:
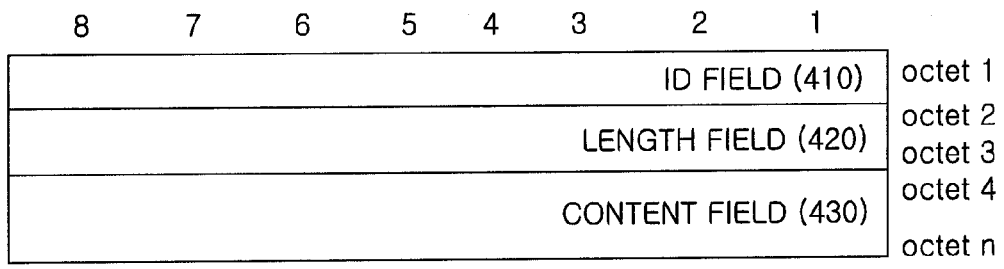
FIG. 4 shows an X2 message container information element (IE) in accordance with the embodiment of the present invention.

FIG. 4 shows an X2 message container IE in accordance with the embodiment of the present invention. The X2 message container IE 400 may include an ID field 410, a length field 420, and a content field 430. The ID field 410 is a field which represents an ID regarding what X2 message is encoded in the content field 430.

The ID field 410 of the X2 message container IE 400 is also called an X2 message container IE ID (IEI) and has a unique value in a message used in the S1 interface and a message used in the X2 interface. The length field 420 is a field which represents a total length of the content field 430. The content field 430 is a field into which an X2 message to be actually transferred is inserted. In this embodiment, the interference control message is stored in the content field 430. In FIG. 4, the ID field 410 has a length of 1 octet, and the length field 420 has a length of 2 octets.

Figure 5:
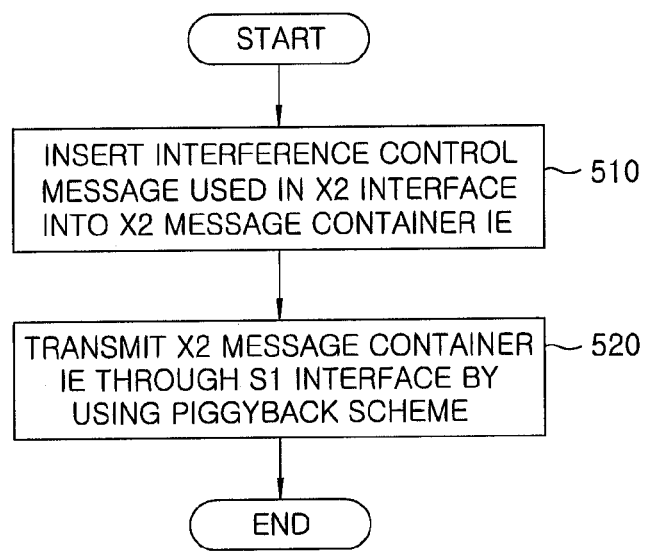
FIG. 5 is a flowchart showing a schematic flow of an interference control method in accordance with the embodiment of the present invention.

FIG. 5 is a flowchart showing a schematic flow of an interference control method in accordance with an embodiment of the present invention. In order to control interference between base stations, the X2 interference control message used in the X2 interface is converted into a format of a protocol of the S1 interface to thereby generate an S1 interference control message to be used in the S1 interface. To this end, the X2 interference control message is inserted into the X2 message container IE 400 in step 510. Then, the X2 message container IE 400 including the X2 interference control message is transmitted through the S1 interface by using a piggyback scheme in step 520. The interference between the base stations can be controlled by the X2 message container IE 400 transmitted through the S1 interface, i.e., the S1 interference control message.

Figure 6:
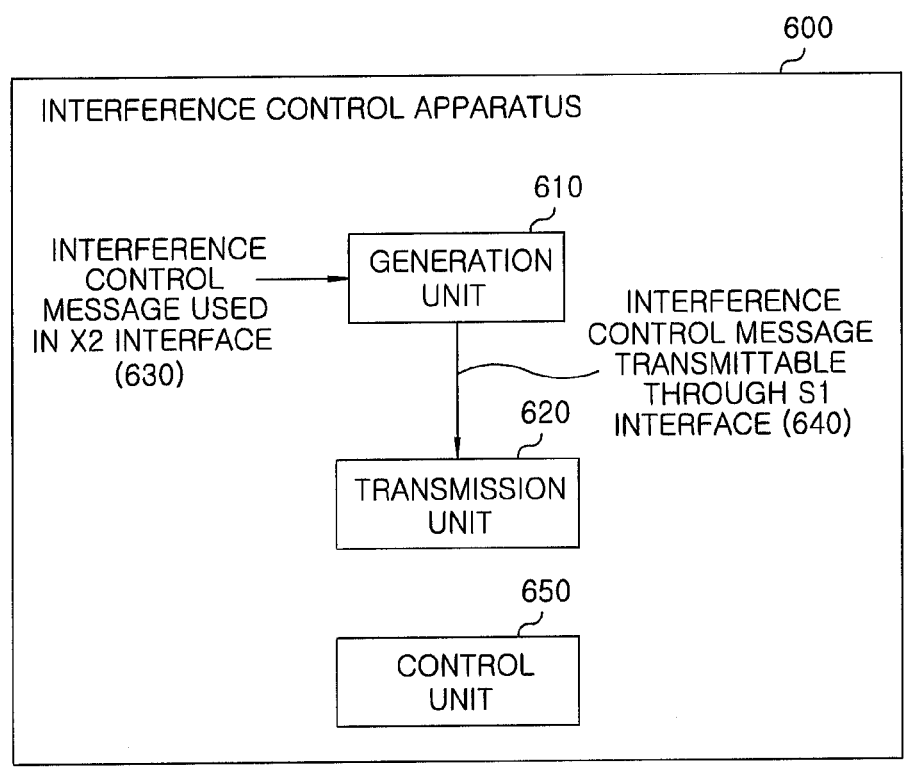
FIG. 6 is a block diagram showing a schematic architecture of an interference control apparatus in accordance with an embodiment of the present invention.

FIG. 6 is a block diagram showing a schematic architecture of an interference control apparatus in accordance with the embodiment of the present invention. The interference control apparatus 600 includes a generation unit 610 and a transmission unit 620. The generation unit 610 generates the S1 interference control message by converting an X2 interference control message 630 used in an X2 interface into a format of a protocol of the S1 interface. In one embodiment, the generation unit 610 inserts the X2 interference control message 630 into the X2 message container IE 400.

Thereafter, the S1 interference control message 640 which is outputted from the generation unit 610 and is transmittable through an S1 interface is inputted to the transmission unit 620. The transmission unit 620 transmits the S1 interference control message 640 through the S1 interface. The S1 interference control message 640 may be transmitted by using a piggyback scheme.

The interference control apparatus 600 may further include a control unit 650 which controls the interference between the base stations, based on the interference control message transmitted through the S1 interface.

In accordance with the embodiment of the present invention, since the interference between the femtocell base stations is controlled by using the existing X2 interference control message in the femtocell environment where no X2 interface exists, the efficient interference control can be achieved even in the femtocell environment where no X2 interface exists.

Further, since the interference control message is not newly defined in the S1 interface, the waste of communication resources can be prevented and a rapid processing can be provided.

While the invention has been shown and described with respect to the embodiments, it will be understood by those skilled in the art that various changes and modifications may be made without departing from the scope of the invention as defined in the following claims.

What is claimed is:

1. A method for controlling interference between base stations in a radio communication system, the method comprising:
providing a radio communication system including at least a gateway, a first base station, a second base station, and a first interference control message in a format of a protocol of a direct interface, wherein the first base station is connected to the second base station through an indirect interface for indirectly connecting the first and second base stations via the gateway, wherein a direct interface for directly connecting the base stations does not exist,
transmitting the first interference control message in a format of a protocol of the indirect interface from the first base station to the second base station through the indirect interface, the transmitting comprising:
converting the first interference control message in the direct interface protocol into the format of the protocol of the indirect interface to thereby generate a second interference control message with the same content but different message format protocol by inserting the first interference control message in the direct interface protocol into a direct message container information element and transferring the direct message container information element in the protocol of the indirect interface.

2. The method of claim 1, wherein the indirect interface is an interface which passes through one or more among a Mobility Management Entity (MME), a Serving GateWay (S-GW), and a Home evolved Node B GateWay (HeNB GW).

3. The method of claim 1, wherein said generating the second interference control message includes inserting the first interference control message into a message container information element.

4. The method of claim 3, wherein the message container information element includes an ID field, a length field, and a content field.

5. The method of claim 4, wherein the ID field is a field which represents an ID of the first interference control message inserted into the message container information element;

the length field is a field which represents a length of the content field; and the content field is a field into which the first interference control message is inserted so the second interference control message has the same content in a different message format protocol.

6. The method of claim 1, wherein said transmitting the second interference control message includes:

inserting the second interference control message into a message to be transmitted through the indirect interface; and transmitting the message by using a piggyback scheme.

7. The method of claim 1, further comprising controlling the interference between the base stations, based on the second interference control message which has the same content but different message format protocol.

8. The method of claim 1, wherein the first interference control message includes load information containing an uplink overload and a transmission power.

9. The method of claim 1, wherein the direct interface is an X2 interface, and the indirect interface is an S1 interface.

10. The method of claim 1, wherein the base station is a femtocell base station.

11. An apparatus for controlling interference between base stations in a radio communication system, the apparatus comprising:

a radio communication system including at least a gateway, a first base station, a second base station, and a first interference control message in a format of a protocol of a direct interface, wherein:

the first base station is connected to the second base station through an indirect interface for indirectly connecting the first and second base stations via the gateway, wherein a direct interface for directly connecting the base stations does not exist, and the first interference control message in a format of a protocol of the indirect interface is transmitted from the first base station to the second base station through the indirect interface, the first interface control message transmitted in:

a generation unit for converting the first interference control message used in the direct interface into the format of a protocol of the indirect interface to thereby generate a second interference control message with the same content but different message format protocol by inserting the first interference control message in the direct interface protocol into a direct message container information element and transferring the direct message container information element in the protocol of the indirect interface.

12. The apparatus of claim 11, wherein the indirect interface is an interface which passes through one or more among a Mobility Management Entity (MME), a Serving GateWay (S-GW), and a Home evolved Node B GateWay (HeNB GW).

13. The apparatus of claim 11, wherein the generation unit inserts the first interference control message into a message container information element.

14. The apparatus of claim 13, wherein the message container information element includes the ID field, a length field, and a content field.

15. The apparatus of claim 14, wherein the ID field is a field which represents an ID of the first interference control message inserted into the message container information element;

the length field is a field which represents a length of the content field; and the content field is a field into which the first interference control message is inserted so the second interference control message has the same content in a different message format protocol.

16. The apparatus of claim 11, wherein the transmission unit inserts the second interference control message into a message to be transmitted through the indirect interface and transmits the message by using a piggyback scheme.

17. The apparatus of claim 11, further comprising a control unit for controlling the interference between the base stations, based on the second interference control message which has the same content but different message format protocol.

18. The apparatus of claim 11, wherein the first interference control message contains load information including an uplink overload and a transmission power.

19. The apparatus of claim 11, wherein the direct interface is an X2 interface, and the indirect interface is an S1 interface.

20. The apparatus of claim 11, wherein the base station is a femtocell base station.

* * * * *